(12) United States Patent
Sperber et al.

(10) Patent No.: US 11,532,995 B2
(45) Date of Patent: Dec. 20, 2022

(54) ELECTRONIC MODULE FOR AN ELECTRIC DRIVE OF A VEHICLE WITH CURRENT PATHS OF EQUAL LENGTH FOR A HIGHSIDE SWITCH AND A LOWSIDE SWITCH

(71) Applicant: ZF Friedrichshafen AG, Friedrichshafen (DE)

(72) Inventors: Michael Sperber, Bayreuth (DE); Stefan Hain, Haag (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 22 days.

(21) Appl. No.: 17/082,987

(22) Filed: Oct. 28, 2020

(65) Prior Publication Data
US 2021/0126546 A1    Apr. 29, 2021

(30) Foreign Application Priority Data
Oct. 29, 2019 (DE) .................... 10 2019 216 679.2

(51) Int. Cl.
| | | |
|---|---|---|
| B60L 15/00 | (2006.01) | |
| H02M 1/084 | (2006.01) | |
| H02M 7/00 | (2006.01) | |
| H02M 7/5388 | (2007.01) | |

(52) U.S. Cl.
CPC .......... H02M 7/003 (2013.01); B60L 15/007 (2013.01); H02M 1/084 (2013.01); H02M 7/5388 (2013.01)

(58) Field of Classification Search
USPC .................................................. 307/10.1, 9.1
See application file for complete search history.

(56) References Cited

U.S. PATENT DOCUMENTS

| | | | |
|---|---|---|---|
| 2006/0007721 A1* | 1/2006 | Rodriguez ............ | H02M 7/003 363/146 |
| 2010/0073659 A1* | 3/2010 | Mikami ................ | G03B 27/72 355/69 |
| 2020/0066686 A1* | 2/2020 | Mohn ................... | H02M 7/003 |

FOREIGN PATENT DOCUMENTS

DE    102017205385    * 10/2018

* cited by examiner

*Primary Examiner* — Rexford N Barnie
*Assistant Examiner* — Xuan Ly
(74) *Attorney, Agent, or Firm* — Crowell & Moring LLP

(57) ABSTRACT

The invention relates to an electronic module for an electric drive in a vehicle, comprising an input-side electrical connection for inputting an input current generated by an energy source; an intermediate circuit with a capacitor; a semiconductor bridge circuit, connected in parallel to the intermediate circuit, wherein the bridge circuit comprises a high-side switch, and a low-side switch connected in series to the high-side switch, wherein the high-side switch is connected to the input-side electrical connection via a first current path, wherein the low-side switch is connected to the input-side electrical connection via a second current path, wherein the first current path and the second current path are the same length; and an output-side electrical connection for outputting an output current generated by the bridge circuit from the input current.

10 Claims, 2 Drawing Sheets

ELECTRONIC MODULE FOR AN ELECTRIC DRIVE OF A VEHICLE WITH CURRENT PATHS OF EQUAL LENGTH FOR A HIGHSIDE SWITCH AND A LOWSIDE SWITCH

CROSS-REFERENCE TO RELATED APPLICATIONS

This application claims priority from German Application No. 10 2019 216 679.2, filed on Oct. 29, 2019, the entirety of which is hereby fully incorporated by reference herein.

TECHNICAL FIELD

The present invention relates to the field of electromobility, in particular the electronic modules for an electric drive.

TECHNICAL BACKGROUND

The use of electronic modules, i.e. power electronics modules, in motor vehicles has increased significantly in the last few decades. This can be attributed in part to the necessity of fuel conservation and improving vehicle performance, and in part to the advances in semiconductor technology. A prominent example of such electronic modules are DC/AC inverters, which are used to supply electric machines such as electric motors or generators with a multiphase alternating current. This involves converting a direct current generated from a DC energy source, e.g. a battery, into a multiphase alternating current. The electronic modules comprise numerous electronic components for this, e.g. semiconductor switches, with which bridge circuits (such as half bridges) can be obtained.

The linking of microelectronic and non-electronic microcomponents to obtain a complete system normally requires the implementation of so-called structural and connecting technologies in the case of the electronic modules, in particular inverters. These are complex processes, resulting in high production costs for the inverters. To reduce production difficulties while maintaining a sufficiently high power, frame modules are used with established semiconductor materials (e.g. silicon).

These frame modules are not as available with the use of novel, wide bandgap semiconductors such as silicon carbide (SiC) or gallium nitride (GaN) as they are with the established semiconductors. This results in an increased dependency on a small number of suppliers of these frame modules, such that in some circumstances, it must be assumed that there will be shortages or inflated prices. Particularly with mass productions of large quantities, frame modules have disadvantages for these reasons, specifically because large frame modules have the additional disadvantage that they make it difficult to scale down the size of the final product.

A method has been developed to avoid the aforementioned problems, known in the field as "discrete power switch packaging." The current is conducted in this method from a battery terminal in the inverter to an intermediate circuit capacitor. With such a construction, the high-side power switch and the low-side power switch, which collectively form a half bridge, are arranged successively, starting from the intermediate circuit capacitor. This asymmetrical arrangement results in a large commutation cell with increased leakage inductance, that exhibits poor switching behavior on the part of the power semiconductors. Furthermore, this serial construction of the power switch requires a complicated concept for obtaining the direct current from the energy source and outputting the alternating current to the electric machine (e.g. an electric motor). By way of example, a multidimensional bus bar concept may be necessary, resulting in increased demands on the bus bar cross section to conduct the necessary currents. The overall power electronics is therefore difficult to cool, thus having a negative effect on the functionality of the electronic module.

The object of the invention is therefore to create an electronic module in which the disadvantages described above are at least in part overcome.

This object is achieved with an electronic module and the use of such an electronic module in a vehicle according to the independent claims.

The electronic module in the framework of this invention is used to operate an electric drive in a vehicle, in particular an electric vehicle and/or a hybrid vehicle. The electronic module preferably comprises a DC/AC inverter or a part thereof. Alternatively or additionally, the electronic module can comprise an AC/DC rectifier, a DC/DC converter, a transformer, and/or another type of electrical converter, or a part of such a converter, or it can be a part thereof. In particular, the electronic module is used to supply an electric machine with power, e.g. an electric motor and/or a generator. A DC/AC inverter is preferably used to generate a multiphase alternating current from a direct current generated by means of a DC voltage from an energy source such as a battery.

In addition to an input-side electrical connection for supplying an input current generated by means of an energy source, and an output-side electrical connection for outputting an output current generated from the input current, the electronic module also has a semiconductor bridge circuit and an intermediate circuit. With respect to the input-side electrical connection, the bridge circuit is connected in parallel to the intermediate circuit and comprises a high-side switch (HSS) and a low-side switch (LSS), which is connected in series to the high-side switch. The HSS is connected to the intermediate circuit via a first current path for a first current flow. The LSS is connected to the intermediate circuit via a second current path for second current flow.

The first current path and the second current path are the same length. The lengths of the respective current paths are the lengths current is conducted between the respective drain connection or source connection on the respective power switch and the respective connecting point at which the associated power switch is connected to the intermediate circuit. The length of the current path is preferably measured in relation to the connection from the drain connection and the source connection that is closest to the intermediate circuit. The equivalency of the lengths is understood in the framework of this invention to mean that the difference between the lengths of the two current paths lies below a predefined threshold. The predefined threshold is preferably in a range of 0 to 20%, more preferably 0 to 10%, more preferably 0 to 5%.

Alternatively or additionally, the first current flow is antiparallel to the second current flow. "Antiparallel" in the framework of this invention is understood to mean that the first current flow and the second current flow are at an angle to one another, at least over a predefined portion of the first and second current paths, which angle lies below a predefined threshold. The predefined portion preferably lies in a range of 50% to 100%, more preferably 75% to 100%, more preferably 90% to 100%. The predefined threshold preferably lies in a range of 1° to 20°, more preferably 1° to 10°, more preferably 1° to 5°.

The HSS and/or LSS comprises one or more power semiconductor components, such as IGBTs or MOSFETs. The HSS and LSS preferably form a half bridge. The bridge circuitry can be placed on a printed circuit board, such that the power switch can be connected electrically and/or for signal transference to a control unit in the vehicle, e.g. an electronic control unit (ECU), by means of electrical contacts on the populated side of the printed circuit board. The control unit is therefore capable of activating the power switch to operate the electric drive, in particular to supply power to the electric machine. The printed circuit board can comprise a circuit board (e.g. a PCB), or a flexible printed circuit board.

The electronic module can contain a heat sink for discharging heat generated by the power semiconductors. Alternatively, the heat sink can be an external, e.g., central cooling unit, to which numerous electronic modules can be simultaneously connected for cooling purposes.

The connection between the bridge circuit and the printed circuit board and/or the connection between the printed circuit board and the heat sink is preferably an adhesive, screw, welded, plug-in, and/or clamp connection.

Because the first current path and the second current path are the same length, the HSS and the LSS are arranged symmetrically in relation to the intermediate circuit. This symmetry can contribute to reducing leakage inductance in the power lines in the electronic module.

Because the first current flow is antiparallel to the second current flow, the magnetic fields, which generate the two current flows and cause leakage inductance when the electronic module is in operation, cancel each other out particularly effectively.

Advantageous embodiments and developments are described in the dependent claims.

According to one embodiment, the semiconductor bridge circuit contains numerous bridge circuit segments, each of which is assigned a current phase.

Different bridge circuit segments are assigned different current phases, such that a "one-to-one" relationship between the bridge circuit segments and the current phases is obtained. An output-side electrical connection belonging to one of the respective current phases is preferably used for outputting the current phases. This results in a multiphase electronic module.

According to another embodiment, each of the bridge circuit segments comprises one or more half bridges, wherein the numerous half bridges in the respective bridge circuit segments are connected in parallel.

This makes it possible to easily scale the current phases that are to be output. Each current phase can be output multiple times, such that numerous electric drive units can be simultaneously supplied with power.

According to another embodiment, the semiconductor bridge circuit has an annular configuration, in which the bridge circuit segments each form a section of the annular arrangement.

The annular arrangement is polygonal, for example, in particular in the shape of a square. This allows for a symmetrical arrangement of the individual half bridges in the respective bridge circuit segments. This also allows for a particularly symmetrical arrangement of bridge circuit segments in relation to one another. Furthermore, commutation inductances of the individual half bridges in the bridge circuit segments are also minimized. A triangular, trapezoidal, and/or circular shape are also conceivable. The power switches in each of the bridge circuit segments are preferably placed along the associated annular segment.

According to another embodiment, the annular arrangement is defined by the intermediate circuit, in particular the capacitor in the intermediate circuit.

A high degree of symmetry in the arrangement of the half bridges and a reduction in the leakage inductance to be obtained in a particularly simple manner by this means. In particular, the equal lengths and antiparallel directions of the first and second current paths can be directly defined by the shape of the intermediate circuit capacitor.

According to another embodiment, the high-side switch is connected to a positive contact, and the low-side switch is connective to a negative contact in the intermediate circuit.

If numerous half bridges are contained in a bridge circuit segment, all of the HSSs in the half bridges are connected to a positive contact, and all of the LSSs in the half bridges are connected to a negative contact. As a result, the HSSs and LSSs can be arranged adjacently instead of successively. A short connection between the power supply terminals in the half bridges and the intermediate circuit can therefore be obtained for all of the power switches.

According to another embodiment, the output-side electrical connection is located on a side of the bridge circuit facing away from the intermediate circuit.

As a result, terminals for the respective current phases do not have to be in located in the middle of the half bridges, but instead can be to the side thereof. The electronic module can therefore assume a simple geometry in which the terminals are at a uniform height. Such a geometry is advantageous for a large surface area cooling, because the surface area effectively in contact with the cooling unit is increased because of this. This also results in the possibility of obtaining higher output-side current densities without an increase in temperature.

Embodiments shall now be described by way of example and with reference to the attached drawings. Therein:

Identical or functionally similar elements have the same reference symbols in the figures. The respective relevant elements are indicated in the individual figures.

Figure 1:
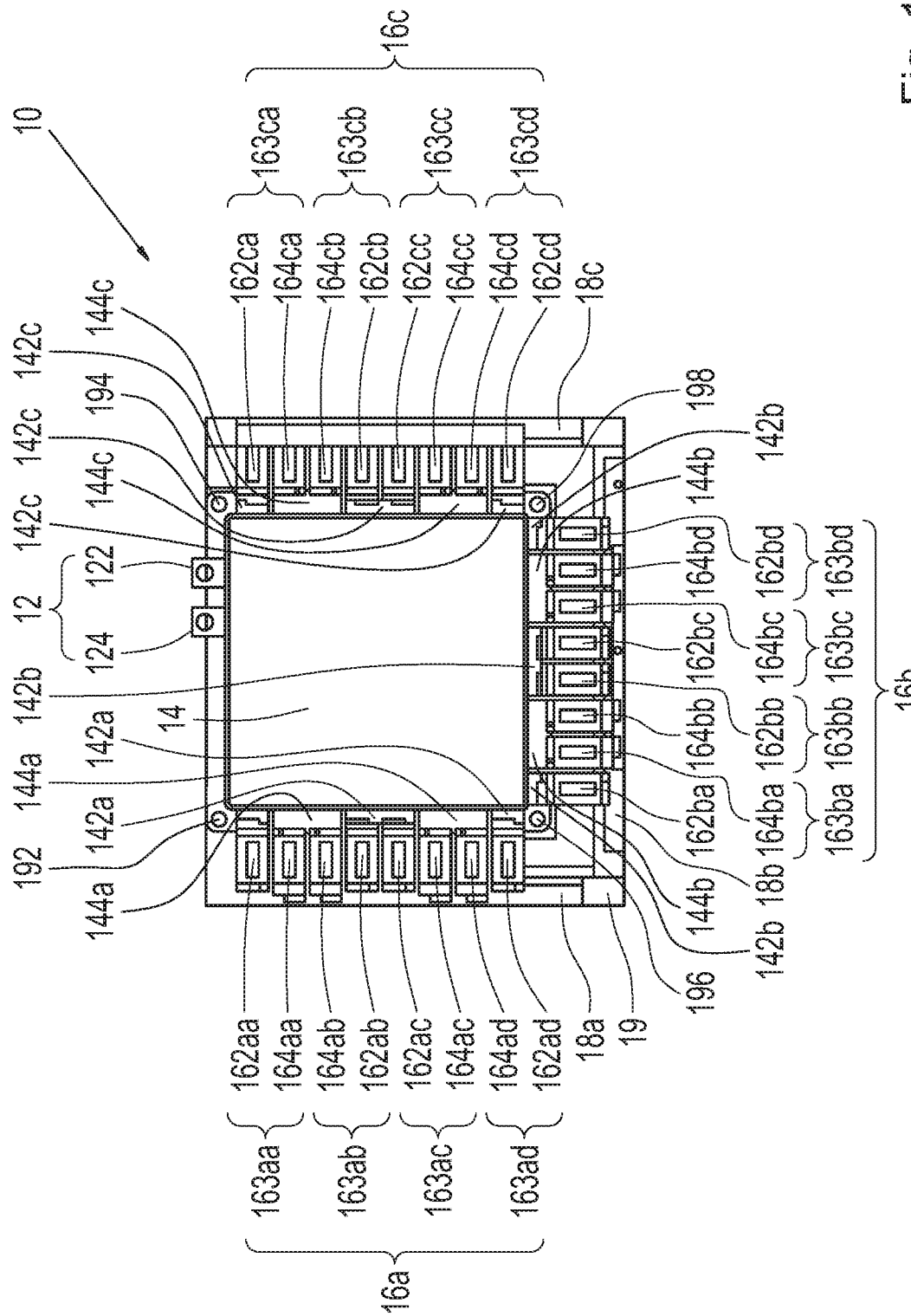
FIG. 1 shows a schematic illustration of an electronic module according to an embodiment in a top view.

FIG. 1 shows a schematic illustration of an electronic module 10. The electronic module 10 preferably comprises a DC/AC inverter for supplying current to an electric drive for an electric and/or hybrid vehicle. Alternatively, the electronic module 10 comprises a part of a DC/AC inverter. The DC/AC inverter is used to input a direct current generated by means of a DC energy source, e.g. a battery, and to generate a multiphase alternating current therefrom, and output this current. The electronic module 10 has an input-side electrical connection 12 for inputting the direct current, which comprises a positive pole 122 and a negative pole 124. A DC voltage is therefore formed between the positive pole 122 and the negative pole 124 when the electronic module 10 is connected to the DC energy source. Although a constant DC voltage is desirable, the DC voltage may be afflicted with voltage ripples due to parasitic influences. To counteract this, the electronic module 10 comprises an intermediate circuit 14, which contains an intermediate circuit capacitor. The intermediate circuit 14 is annular. In the exemplary embodiment shown in FIG. 1, the intermediate circuit 14 is square. The input-side electrical connection 12 is located on an upper side of the square in the view shown therein. A bridge circuit segment 16*a*, 16*b*, 16*c* is located on each of the other three sides of the square, which shall be explained in greater detail below.

The three bridge circuit segments 16a, 16b, 16c collectively form the bridge circuit for the overall electronic module 10. Each bridge circuit segment 16a, 16b, 16c is assigned one of three current phases. The exemplary electronic module 10 in FIG. 1 therefore forms a three-phase systems, which is capable of generating a three-phase alternating current. Each bridge circuit segment 16a, 16b, 16c comprises eight power switches, which form four half bridges 163aa-cd. Each half bridge 163aa-cd comprises an HSS 162aa-cd and a LSS 164aa-cd. The bridge circuit segments 16a, 16b, 16c are therefore offset to one another at an angle of substantially 90°.

As shown in FIG. 1, the HSSs 162aa-cd are electrically connected to a positive contact 142a, b, c in the intermediate circuit 14, which is connected to the input-side electrical connection 12 and thus assigned to a positive potential in the DC energy source (not shown). The LSSs 164aa-cd are electrically connected to a positive contact 144a, b, c in the intermediate circuit 14 that is connected to the negative pole 124 of the input-side electrical connection 12, and thus assigned to a negative potential of the DC energy source (not shown). All of the power switches 162aa-cd, 164aa-cd in the bridge circuit that are in the direct proximity of the intermediate circuit 14 are connected to the positive or negative contacts 142a, b, c and 144a, b, c. In particular, the distance between the respective power switches 162aa-cd, 164aa-cd and the respective positive or negative contacts 142a, b, c and 144a, b, c is not greater than an extension of the electrical contacts in the power semiconductors 12aa-cd, 164aa-cd themselves.

There are output-side electrical connections 18a, 18b, 18c for outputting the currents of the respective phases on the sides of the respective bridge circuit segments 16a, 16b, 16c facing away from the intermediate circuit 14. Although it is not explicitly shown in FIG. 1, each output-side electrical connection 18a, 18b, 18c comprises four so-called terminals, each of which is assigned to one of the four half bridges 163a, b, c of the respective bridge circuit segments 16a, b, c. The terminals are electrically separated from one another, such that an associated output current can be output separately by each of these terminals. The output-side electrical connections 18a, b, c are preferably in contact with a bus system, i.e. an AC busbar, e.g. by means of a welded connection.

Figure 2:
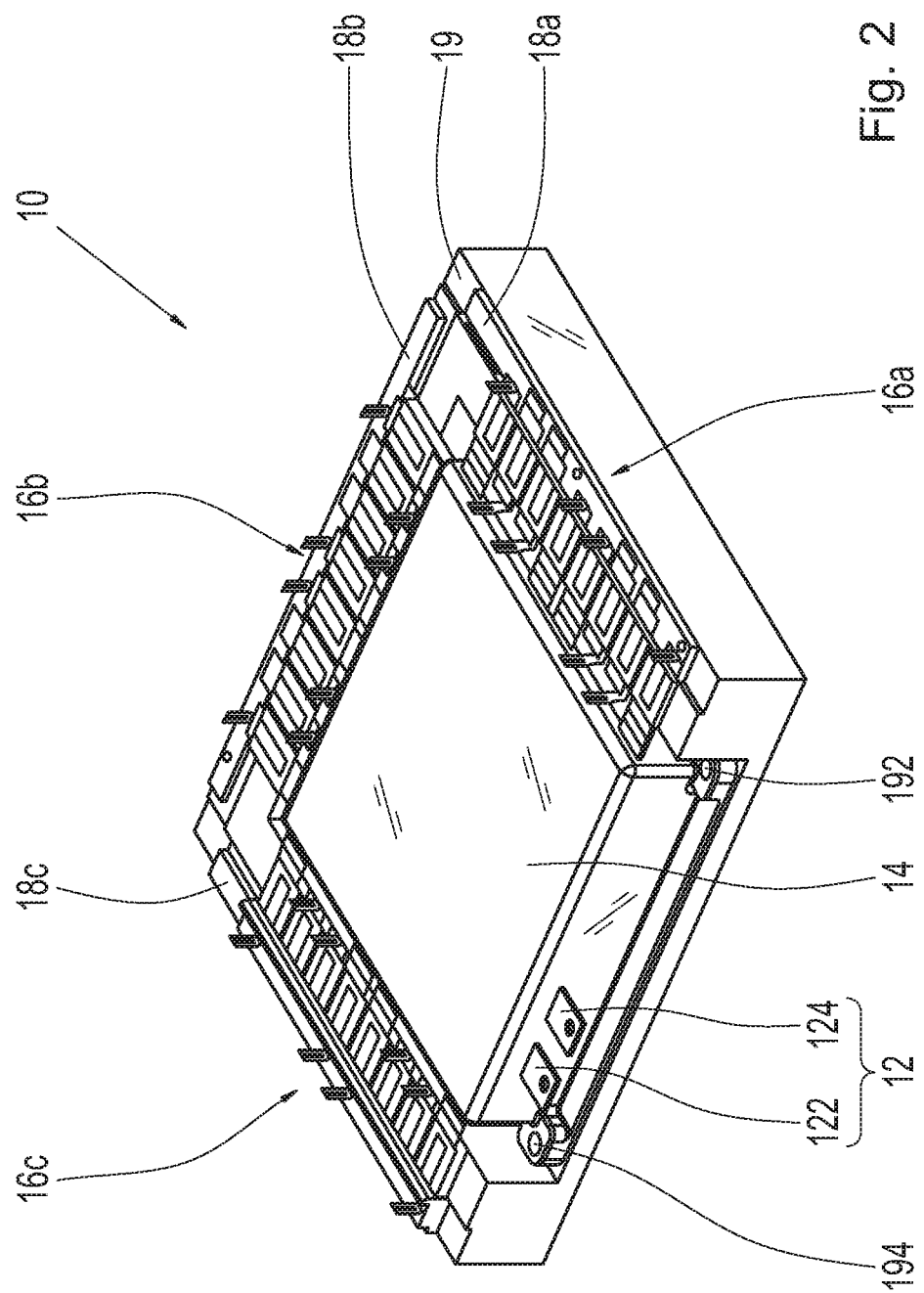
FIG. 2 shows a schematic illustration of the electronic module from FIG. 1 in a perspective view.

The intermediate circuit 14 is secured to a carrier 19 at four attachment points 192 to 198, each of which is located in a corner of the square. FIG. 2 shows another schematic illustration of the electronic module 10 in a perspective view. The relative positions and orientations of the individual components in the electronic module 10 are indicated by the superimposed coordinate system.

The exemplary structure of the electronic module 10 shown in FIGS. 1 and 2 comprises 24 power switches that form 12 half bridges 163aa-cd, wherein there are four half bridges 163aa-cd in each of the three bridge circuit segments 16a, 16b, 16c. The electronic module 10 can be used, for example, to generate an alternating current with a maximum amperage of 600 A. The maximum amperage that the electronic module 10 can be used with can be varied by altering the population of power switches and/or by changing the size of the intermediate circuit, or the number of terminals.

A "duplicated" structure is also conceivable, in which two of the electronic modules 10 shown in FIG. 2 are joined to one another at their respective undersurfaces (extending in an x-y plane, as shown in FIG. 2) facing away from the intermediate circuit. These undersurfaces of the two electronic modules 10 can function as a cooling surface, and thus form a heat sink, which is populated on both sides, in a mirror image, with semiconductors. More power switches can be placed on an intermediate circuit assembly composed of the two intermediate circuits of the two electronic modules 10 with this structure. The maximum amperage that can be generated by means of the overall module, which comprises the two electronic modules 10, is therefore increased.

In the example shown in FIG. 1, the left, bottom, and right sides of the intermediate circuit 14 are each assigned a single current phase. Alternatively, two or more current phases can be assigned to at least one of these sides of the intermediate circuit 14. In this case, the intermediate circuit 14 (or the intermediate circuit capacitor) can assume a shape other than the square shown in the figures. An angled AC busbar is preferably used in order to adapt to the alternative shape of the intermediate circuit 14.

Alternatively or additionally, The HSS and LSS are parallel to one another in at least one of the half bridges. In the example shown in FIG. 1, the upper side of the intermediate circuit 14 is not assigned a current phase, but instead only comprises the input-side electrical connection 12. Alternatively, at least one half bridge can be placed on this side.

REFERENCE SYMBOLS 10 electronic module
12 input-side electrical connection
122 positive pole
124 negative pole
14 intermediate circuit
142a, b, c positive contact
144a, b, c negative contact
16a, b, c bridge circuit segment
162aa-cd high-side switch
163aa-cd half bridge
164aa-cd low-side switch
18a, b, c output-side electrical connection
19 carrier
192-198 attachment points

The invention claimed is:

1. An electronic module for an electric drive in a vehicle, comprising:
   an input-side electrical connection configured to input an input current generated by an energy source;
   an intermediate circuit with a capacitor;
   a semiconductor bridge circuit, connected in parallel to the intermediate circuit, wherein the bridge circuit comprises a high-side switch and a low-side switch connected in series to the high-side switch, wherein the high-side switch is connected to the input-side electrical connection via a first current path, and wherein the low-side switch is connected to the input-side electrical connection via a second current path; and
   an output-side electrical connection configured to output an output current generated by the bridge circuit from the input current;
   wherein, at least one of:
      the first current path and the second current path are the same length; or
      a first current flow in the first current path is antiparallel to a second current flow in the second current path;
   wherein the semiconductor bridge circuit contains at least two bridge circuit segments assigned to different current phases, and wherein the semiconductor bridge circuit has an annular arrangement in which the at least two bridge circuit segments each form a section of the annular arrangement.

2. The electronic module according to claim 1, wherein the high-side switch and the low-side switch form a half bridge, wherein each of the bridge circuit segments comprises one or more half bridges, wherein the numerous half bridges in the respective bridge circuit segments are connected in parallel.

3. The electronic module according to claim 1, wherein the high-side switch and the low-side switch in the half bridge or the half bridges of each of the bridge circuit segments are arranged along the associated section of the annular arrangement.

4. The electronic module according to claim 1, wherein the annular arrangement is at least one of circular or polygonal.

5. The electronic module according to claim 1, wherein the annular arrangement includes the intermediate circuit within a center of the annular arrangement.

6. The electronic module according to claim 1, wherein the high-side switch is connected to a positive contact and the low-side switch is connected to a negative contact in the intermediate circuit.

7. The electronic module according to claim 1, wherein the output-side electrical connection is located on a side of the bridge circuit facing away from the intermediate circuit.

8. A vehicle comprising the electronic module according to claim 1.

9. The electronic module according claim 4, wherein the annular arrangement is square.

10. The electronic module according to claim 5, wherein the annular arrangement is defined by includes the capacitor of the intermediate circuit within the center of the annular arrangement.

* * * * *